(12) United States Patent  
Mureinik

(10) Patent No.: US 9,178,886 B2  
(45) Date of Patent: Nov. 3, 2015

(54) FLATTENING PERMISSION TREES IN A VIRTUALIZATION ENVIRONMENT

(75) Inventor: Allon Mureinik, Tel-Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 13/597,695

(22) Filed: Aug. 29, 2012

(65) Prior Publication Data

US 2014/0068718 A1    Mar. 6, 2014

(51) Int. Cl.

| | |
|---|---|
| G06F 21/00 | (2013.01) |
| H04L 29/06 | (2006.01) |
| G06F 21/60 | (2013.01) |
| G06F 21/62 | (2013.01) |
| G06F 17/30 | (2006.01) |
| H04W 12/08 | (2009.01) |
| G06F 21/12 | (2013.01) |
| G06F 21/31 | (2013.01) |

(52) U.S. Cl.
CPC .......... *H04L 63/10* (2013.01); *G06F 17/30418* (2013.01); *G06F 17/30457* (2013.01); *G06F 21/00* (2013.01); *G06F 21/604* (2013.01); *G06F 21/6218* (2013.01); *G06F 21/6227* (2013.01); *H04L 63/101* (2013.01); *H04L 63/102* (2013.01); *H04L 63/104* (2013.01); *H04L 63/105* (2013.01); *H04W 12/08* (2013.01); *G06F 21/121* (2013.01); *G06F 21/31* (2013.01); *G06F 21/629* (2013.01); *G06F 2221/2141* (2013.01); *G06F 2221/2145* (2013.01)

(58) Field of Classification Search
None
See application file for complete search history.

(56) References Cited

U.S. PATENT DOCUMENTS

| | | | | |
|---|---|---|---|---|
| 6,038,563 | A * | 3/2000 | Bapat et al. | 1/1 |
| 6,574,637 | B1 * | 6/2003 | Lindsey | 707/714 |
| 7,404,203 | B2 * | 7/2008 | Ng | 726/6 |
| 7,461,395 | B2 * | 12/2008 | Ng | 726/1 |
| 7,529,728 | B2 * | 5/2009 | Weissman et al. | 1/1 |
| 7,546,631 | B1 * | 6/2009 | Moogala et al. | 726/2 |
| 7,640,264 | B1 * | 12/2009 | Chaulk et al. | 1/1 |
| 8,032,525 | B2 * | 10/2011 | Bowers et al. | 707/722 |
| 8,239,423 | B2 * | 8/2012 | Gitai et al. | 707/803 |
| 8,458,700 | B1 * | 6/2013 | Arrance et al. | 718/1 |
| 2006/0075381 | A1 * | 4/2006 | Laborczfalvi et al. | 717/100 |
| 2006/0173873 | A1 * | 8/2006 | Prompt et al. | 707/100 |
| 2007/0214497 | A1 * | 9/2007 | Montgomery et al. | 726/4 |
| 2007/0250833 | A1 * | 10/2007 | Araujo et al. | 718/1 |
| 2007/0283443 | A1 * | 12/2007 | McPherson et al. | 726/26 |
| 2008/0133486 | A1 * | 6/2008 | Fitzgerald et al. | 707/3 |
| 2008/0201300 | A1 * | 8/2008 | Goodwin et al. | 707/3 |
| 2010/0223309 | A1 * | 9/2010 | Benari | 707/912 |
| 2011/0131572 | A1 * | 6/2011 | Elyashev et al. | 718/1 |
| 2011/0191303 | A1 * | 8/2011 | Kaufman et al. | 707/684 |
| 2011/0191485 | A1 * | 8/2011 | Umbehocker | 709/229 |
| 2011/0219433 | A1 * | 9/2011 | Albrecht-Buehler | 726/4 |
| 2011/0231443 | A1 * | 9/2011 | Hannel et al. | 707/776 |
| 2011/0295838 | A1 * | 12/2011 | Collins et al. | 707/715 |
| 2012/0005190 | A1 * | 1/2012 | Faerber et al. | 707/718 |
| 2012/0158699 | A1 * | 6/2012 | Creel | 707/722 |

(Continued)

*Primary Examiner* — Andrew Nalven  
*Assistant Examiner* — Christopher Ruprecht  
(74) *Attorney, Agent, or Firm* — Lowenstein Sandler LLP

(57) ABSTRACT

A virtualization manager receives a permission request indicating a user and an entity in a virtual machine system. The virtualization manager flattens a permissions database to generate a flattened database view. Using the flattened database view, the virtualization manager determines whether the user has permission to access the entity in the virtual machine system and returns an indication of whether the user has permission to access the entity in the virtual machine system.

22 Claims, 6 Drawing Sheets

(56) References Cited

U.S. PATENT DOCUMENTS

| | | |
|---|---|---|
| 2012/0197864 A1* | 8/2012 | Bourdoncle et al. .......... 707/711 |
| 2012/0203739 A1* | 8/2012 | Soundararajan et al. ..... 707/639 |
| 2012/0233148 A1* | 9/2012 | Chen et al. .................... 707/717 |
| 2012/0246738 A1* | 9/2012 | Shah et al. ...................... 726/28 |
| 2012/0278903 A1* | 11/2012 | Pugh ............................... 726/28 |
| 2012/0317129 A1* | 12/2012 | Qayyum et al. ............... 707/754 |
| 2012/0330925 A1* | 12/2012 | Ramamurthy et al. ....... 707/718 |
| 2013/0054648 A1* | 2/2013 | Mehta et al. ................... 707/785 |
| 2013/0191464 A1* | 7/2013 | Burckart et al. .............. 709/206 |
| 2013/0339385 A1* | 12/2013 | Abrams et al. ................ 707/770 |
| 2014/0025646 A1* | 1/2014 | Canales Valenzuela et al. ............................ 707/691 |

* cited by examiner

FLATTENING PERMISSION TREES IN A VIRTUALIZATION ENVIRONMENT

TECHNICAL FIELD

This disclosure relates to the field of virtualization and, in particular, to flattening permission trees in a virtualization environment.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the virtual machine.

Virtual machines can be provided by a centralized host that is coupled to multiple clients over a network. Each client can provide a virtual desktop environment indistinguishable from a physical desktop. A large organization with many different departments and multiple offices at various locations may have a system with thousands of virtual machines. Management of numerous virtual machines is a complex task that requires a large degree of system scalability.

BRIEF DESCRIPTION OF THE DRAWINGS

The present disclosure is illustrated by way of example, and not by way of limitation, in the figures of the accompanying drawings.

DETAILED DESCRIPTION

Figure 1:
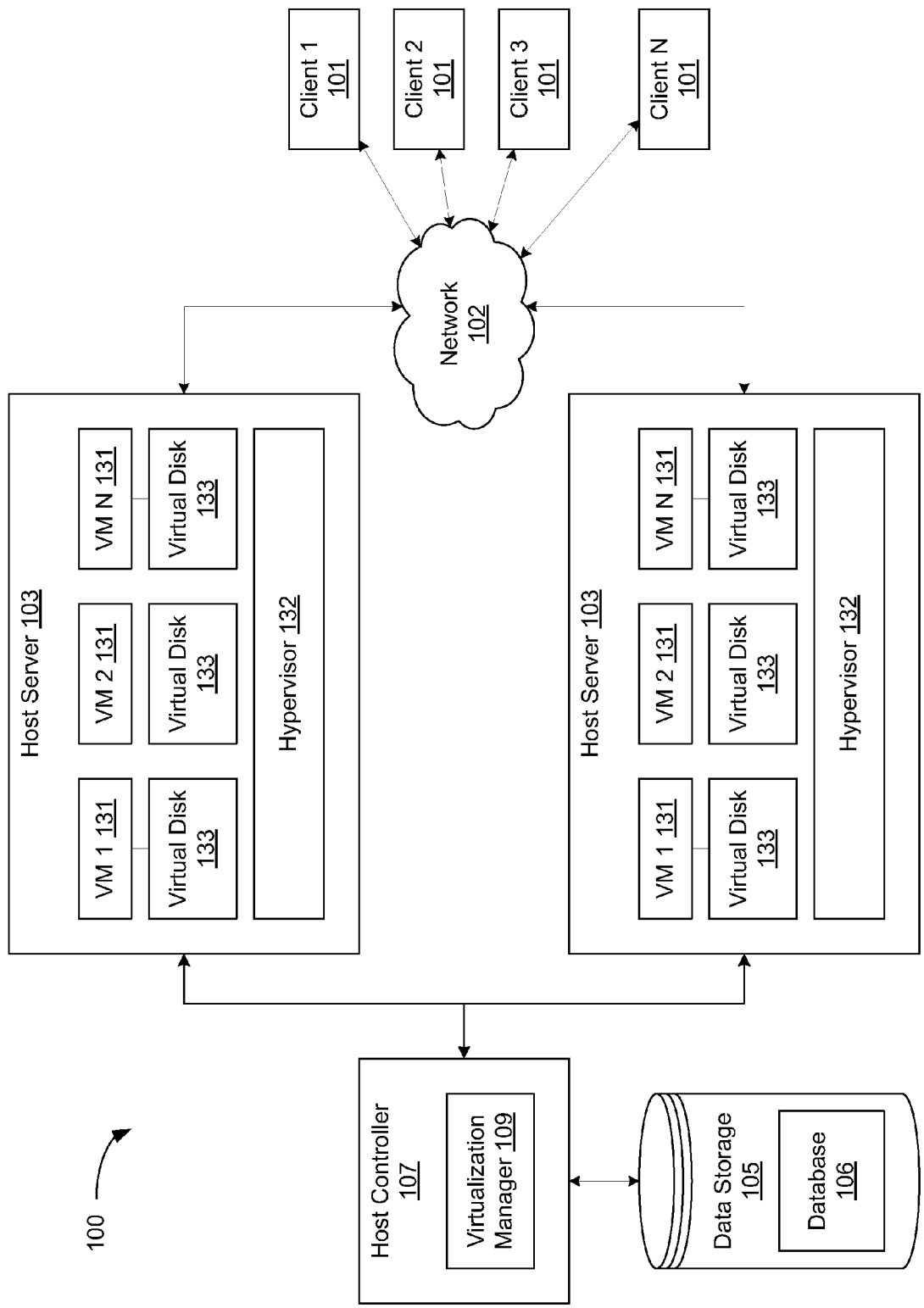
FIG. 1 is a block diagram illustrating an exemplary network architecture in which embodiments of the present invention may operate.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Described herein is a method and system for flattening permission trees in a virtualization environment. In one embodiment, servers hosting virtual machines are coupled to a host controller that associates virtual machines with labels representing distinct virtual machine parameters such as a geographic location of a virtual machine, a department of a virtual machine user, a technical characteristic of a virtual machine, etc. These labels may be organized into a tree having hierarchical relationships. For example, location label "France" may be a parent of department labels "Human Resources," "Finance" and "Billing." In some cases, these child labels may inherit the permissions of the parent label.

The host controller may also maintain multiple roles, where each role defines a set of allowed actions such as viewing virtual machines, adding virtual machines, editing virtual machines, etc. The host controller associates users with appropriate roles and labels to form a hierarchical permission tree. The host controller then uses these associations to facilitate control over user actions pertaining to entities in a virtual machine system. For example, a specific user within a company may be associated with the role of a virtual machine manager to allow this user to add, delete and modify virtual machines or other entities. In addition, this user may be associated with labels "Finance" and "Billing" to permit the user to perform the above actions only with respect to virtual machines from the Finance and Billing departments.

In certain embodiments, permissions for access to virtual machines may be defined based on either the labels, the roles, or a combination of the two. Defining permissions in this manner is generally more convenient than defining permissions for every individual in an organization. That way, if the need arises to changes a user's permissions or add a new virtual machine, the user may simply be assigned to a role and the virtual machine may be given a label. The user or virtual machine will then automatically be assigned the predefined permissions associated with the role or label.

Despite the convenience provided by this system in assigning permissions, it can make verifying permissions significantly more complicated. For example, if a user requests access to a virtual machine or an administrator or program requests the permissions for a certain user or virtual machine, there is no single place to view the specific permissions for a particular user or machine. Generally multiple operations will be needed to verify the permissions, for example including the queries: Does the user have permission for the requested virtual machine?; Does the role(s) to which the user is assigned have permission for the requested virtual machine?; Does the user have permission for a parent label of the virtual machine?; Does the role(s) to which the user is assigned have permission for a parent label of the virtual machine?; etc.

In order to simplify the permission verification process, the host controller can flatten a permissions database containing these various permissions to create a single view that includes the permissions for each combination of user and entity in the virtual machine system. This database view may include a stored query accessible as a virtual table in the database or other data structure. The view may not form part of the physical schema of the database, but rather may include a dynamic, virtual table computed from the data in the database. This database view may be self-descriptive, such that applications accessing the database need not include additional code to process permission verifications. Users and applications accessing the database view may appreciate increased performance attributable to the simplicity of the verification process, and the need for fewer database queries. The self-descriptive view will also be available to applications across varying programming languages, without the need for proprietary permission verification logic.

In other embodiments, the same flattening techniques may be used for other databases. For example, a database containing data other than permissions for access to virtual machines may be flattened and accessed in the same or similar manner as described below, allowing the requestor to obtain the information with only a single query. In other embodiments, the same flattening techniques may also be used for any system that has some form of a permissions system.

FIG. 1 illustrates an exemplary network architecture 100 in which embodiments of the present invention may operate. The network architecture 100 includes one or more host servers 103 coupled to clients 101 over a network 102. The network 102 may be a private network (e.g., a local area network (LAN), wide area network (WAN), intranet, etc.) or a public network (e.g., the Internet). The host servers 103 may also be coupled to a host controller 107 (via a network or directly). Host controller 107 may be an independent machine such as a server computer, a desktop computer, etc. Alternatively, the host controller 107 may be part of the host server 103.

In one embodiment, the clients 101 may include computing devices that have a wide range of processing capabilities. Some or all of the clients 101 may be thin clients, which serve as access terminals for users and depend primarily on the host servers 103 for processing activities. For example, the client 101 may be a desktop computer, laptop computer, cellular phone, personal digital assistant (PDA), etc. The client 101 may run client applications such as a Web browser. The client 101 may also run other client applications, which receive multimedia data streams or other data from the host server 103 and re-direct the received data to a local display or other user interface.

Host servers 103 may include server computers or any other computing devices capable of running one or more virtual machines 131. Each virtual machine 131 runs a guest operating system (OS) that may be different from one virtual machine to another. The guest OS may include Microsoft Windows, Linux, Solaris, Mac OS, etc. The host server 103 may include a hypervisor 132 that emulates the underlying hardware platform for the virtual machines 131. The hypervisor 132 may also be known as a virtual machine monitor (VMM), a kernel-based hypervisor or a host operating system.

Each virtual machine 131 can be accessed by one or more of the clients 101 over the network 102 and can provide a virtual desktop for the client(s) 101. From the user's point of view, the virtual desktop functions as a physical desktop (e.g., a personal computer) and is indistinguishable from a physical desktop. Each virtual machine 131 may be linked to one or more virtual disks 133. These virtual disks 133 can be logical partitions of a physical disk managed by hypervisor 132, can be cloud based storage devices, or can be some other type of virtual storage device. In one embodiment, virtual disks 133 may form a whole or part of a logical data center. In one embodiment, virtual machines 131 and virtual disks 133, together with host servers 103, may be collectively referred to as entities in a virtual machine system.

The virtual machines 131 and virtual disks 133 are managed by the host controller 107. The host controller 107 ensures that operations pertaining to individual virtual machines 131 are performed by appropriate users. For example, in an organization having offices in different geographic locations and a large number of virtual machines in each location, an information technology (IT) director may be allowed to make any changes with respect to virtual machines 131 while a system administrator responsible for a specific office may only be allowed to administer virtual machines in this specific office. In addition, an office may have several departments, with each department having a designated IT technician allowed to oversee operation of virtual machines associated with the respective department.

In one embodiment, the host controller 107 includes a virtualization manager 109 that sets permissions for actions pertaining to various entities in the virtual machine system using hierarchical labeling. In one embodiment, the entities in the virtual machine system may include virtual machines, virtual disks, hosts or host servers, logical data centers, or other entities. For ease of explanation, additional reference to these entities may refer to virtual machines, however, it should be understood that the explanation may apply equally to other entities of the virtual machine system in other embodiments. In particular, the virtualization manager 109 associates each virtual machine 131 with one or more labels representing distinct virtual machine parameters. For example, a virtual machine 131 may be associated with labels representing the geographic location of the virtual machine 131 such as a region label (e.g., Europe), a country label (e.g., France) and a city label (e.g., Paris). In addition, the virtual machine 131 may be associated with labels representing a positioning of a user of the virtual machine 131 within the organization (e.g., a department label, a group label, or a title label). The virtual machine 131 may also be associated with labels representing technical characteristics of a virtual machine (e.g., a memory allocation label, an operating system label, etc.), or with any other labels. The virtualization manager 109 stores associations between virtual machines 131 and respective labels in a database 106 residing on a data storage device 105. In addition, the virtualization manager 109 assigns roles to various users and/or various groups of users, where each role defines a set of actions permitted to be performed by a user or a group of users with respect to virtual machine 131. Further, the virtualization manager 109 associates the users and/or groups of users with respective labels to allow each user to perform actions only with respect to the virtual machines 131 having the matching labels. The virtualization manager 109 stores associations of users and/or groups of users with respective roles and labels in the database 106 residing on the data storage device 105. The data storage device 105 may share the machine with the host controller 107 (e.g., a disk drive in the host controller computer) or be an independent device coupled to the host controller directly or via a network (e.g., as a network-attached storage device (NAS)).

Figure 2:
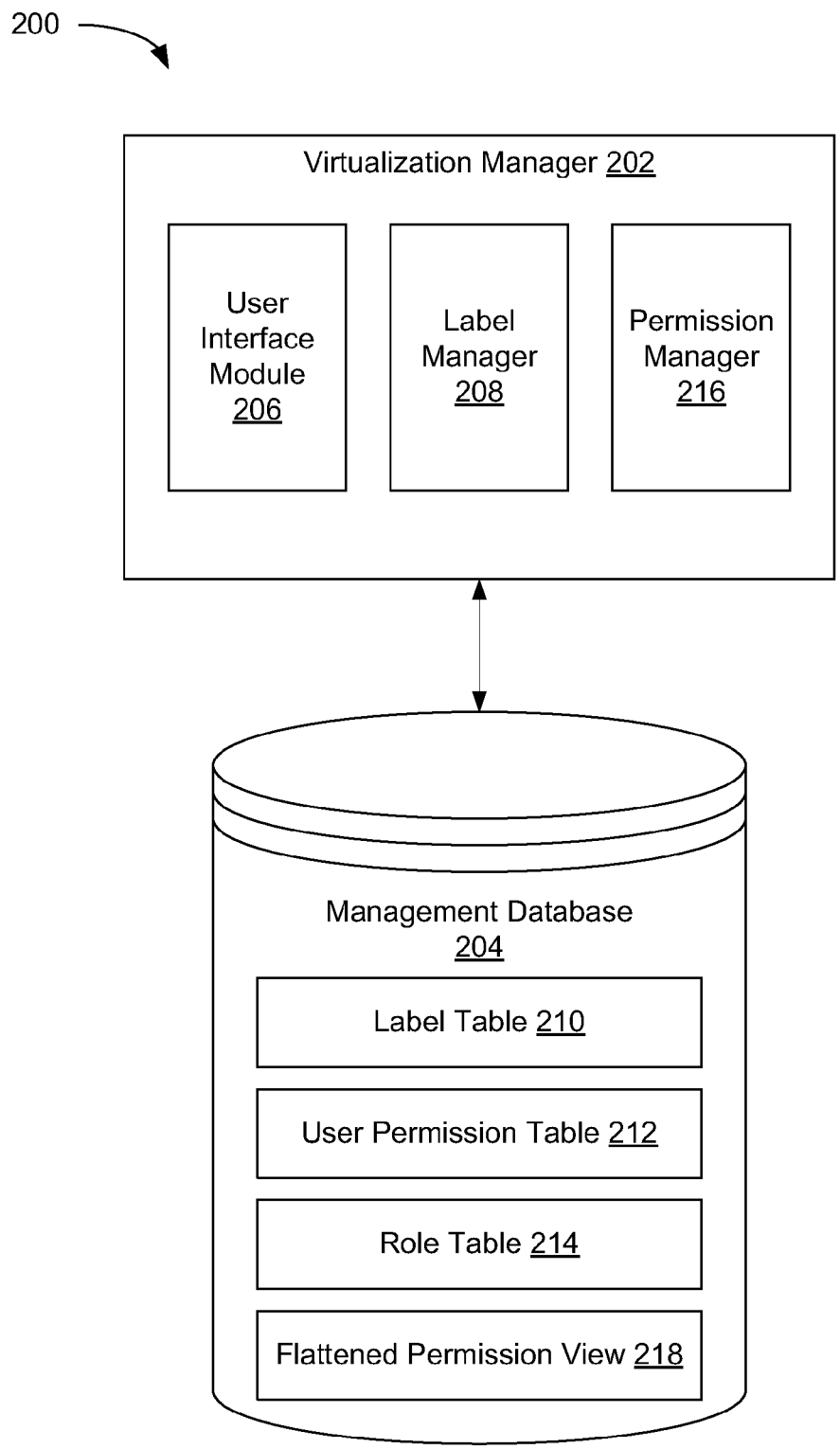
FIG. 2 is a block diagram illustrating a permission control system, according to an embodiment.

FIG. 2 is a block diagram illustrating a permission control system (PCS) 200 in accordance with one embodiment of the present invention. The PCS 200 includes a virtualization manager 202, which may be similar to virtualization manager 109, and a management database 204, which may be hosted by data storage device 105.

The virtualization manager 202 may include a user interface module 206, a label manager 208 and a permission manager 216. The user interface module 206 may provide a labels user interface for specifying labels and hierarchical relationships between the labels. Each label may be an object having an identifier. For example, each label may be an object in the form of a file (e.g., a text file, a XML file, etc.).

The labeling hierarchy can be in the form of a tree where nodes represent labels and edges represent relationships between the labels. In particular, the top node in the tree can represent an organization label (e.g., a company, a university, a library, etc.). The organization label can have child labels such as a division label representing a division within the organization (e.g., Sony Ericsson, Sony Pictures Entertainment, etc.), a location label representing a geographic location (e.g., Europe, North America, Middle East, etc.), a technical component label representing a machine component type (e.g., hardware, operating system, application, etc.), etc. These labels may, in turn, be parents of other labels. For example, the division label can be a parent of department labels representing departments of virtual machine users within the division, with each department label being a parent of group labels representing groups of virtual machine users within the department. The location label can be a parent of country labels representing different countries, with each country being a parent of city labels. The technical component label can be a parent of technical characteristic labels representing specific technical characteristics of a virtual machine (e.g., a memory allocation parameter, a graphics parameter, etc.).

The labeling hierarchy provides an easy and convenient way of tagging virtual machines with a wide variety of labels and defining relationships between these labels. Associations between the labels and respective virtual machines are stored in the management database 204 (e.g., label table 210) using identifiers of virtual machines and identifiers of labels. Thus, label table 210 may define permissions for the virtual machines based on the label assigned to each virtual machine. In one embodiment, child labels may inherit the permissions of parent labels, according to the label hierarchy. In one embodiment labels in the hierarchy may be assigned to other objects besides virtual machines. For example, host server 103 may have a label that is a parent of the label assigned to virtual machine 131 in the hierarchy. In this case, a user with permissions for host server 103 may also have the same permissions for the virtual machine 131 running on that host server 103.

The user interface module 206 may also provide a roles user interface that receives user input identifying various user roles (e.g., IT director, system administrator, virtual machine manager, end user, etc.) and actions permitted for each user role. Information identifying the user roles and corresponding permitted actions is stored in the management database 204 (e.g., in a role table 214). Thus, role table 214 may define permissions for the actions users assigned to a role are allowed to perform on certain virtual machines or other objects.

The user interface module 206 may further provide a permissions user interface that receives user input assigning roles to specific users and/or groups of users and user input associating users and/or groups of users with labels. Associations of users and/or groups of users with corresponding roles and labels are stored in the management database 204 (e.g., in a user permission table 212). In one embodiment, if a user is part of one or more groups, the user has the same roles and labels as those associated with the user's group(s). In addition to group permissions, the user may have individual permissions based on roles and labels assigned to this specific user. These permissions may be stored in user permission table 212.

The label manager 208 handles user requests pertaining to labels. For example, a system administrator may need to know parameters of a specific virtual machine, or virtual machines that have one or more parameters in common. Upon receiving a system administrator request, the label manager 208 searches the management database 204 (e.g., the label table 210) and retrieves the requested information. In another embodiment, the permissions in label table 210, user permission table 212 and role table 214 may be stored together in a single table, but still be defined separately.

The permission manager 216 controls user actions pertaining to virtual machines. In particular, the permission manager 216 receives a user request to perform a certain action concerning a virtual machine (e.g., modify a virtual machine or delete a virtual machine) and issues a query to management database 204 to create a flattened view 218, or consults a flattened view 218 if one was previously created. Permission manager 216 may consult the flattened view 218 to determine if the user has the necessary permissions for the requested virtual machine. Flattened permission view 218 may combine permissions defined for particular labels (e.g., from label table 210), users (e.g., from user permission table 212), and/or roles (e.g., from role table 214) to include individual permissions for each combination of user and virtual machine. This flattened view 218 may include a stored query accessible as a virtual table in the database 204 or other data structure. The view 218 may not form part of the physical schema of the database 204, but rather may include a dynamic, virtual table computed from the data in the database 204. This flattened view 218 may be self-descriptive, such that applications accessing the database 204 need not include additional code to process permission verifications. As discussed above, permission manager 216 need only make a single query and the flattened view 218 returns a binary result of yes/no, true/false, etc. If the permission determination is negative, the permission manager 216 denies the user request. Otherwise, if the determination is positive, the permission manager 216 allows the requested action to proceed.

Figure 3:
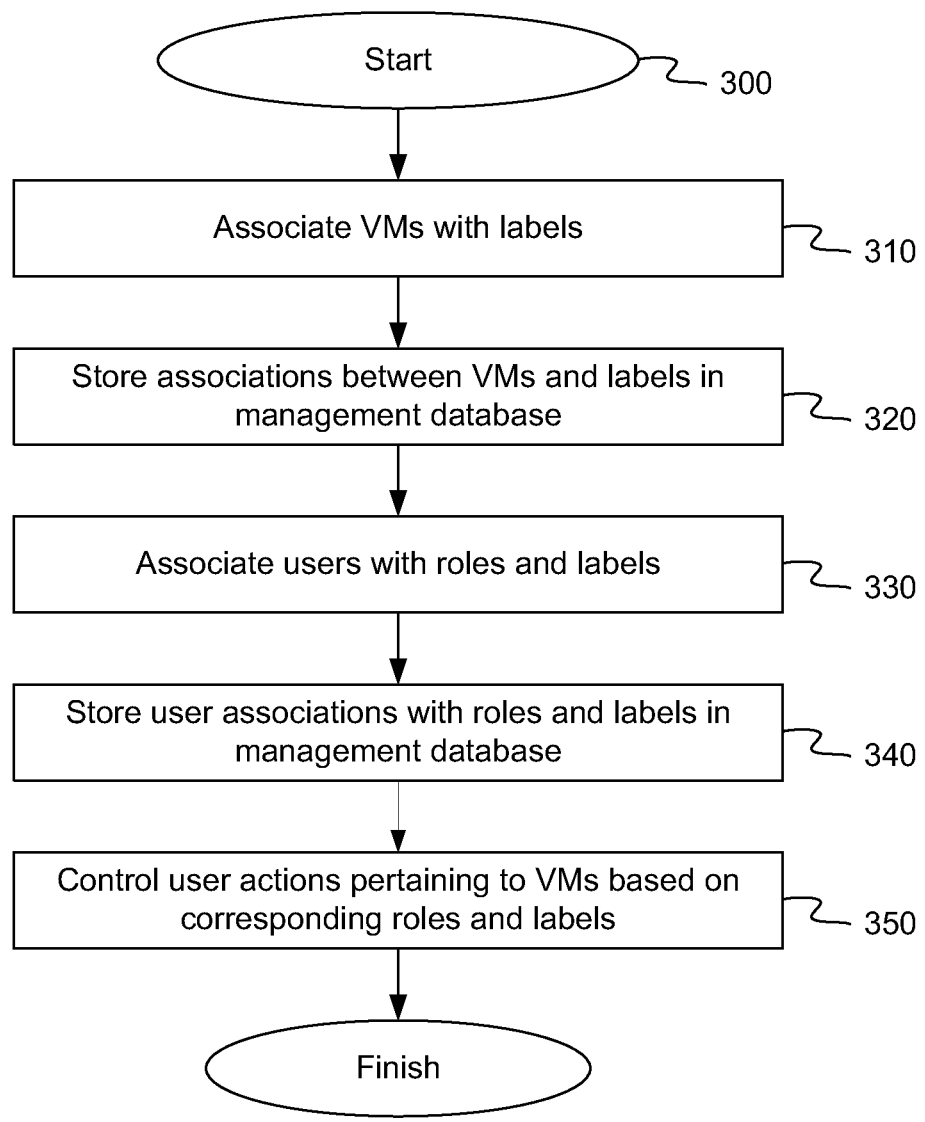
FIG. 3 is a flow diagram illustrating a method for facilitating control of permissions in a virtualization environment, according to an embodiment.

FIG. 3 is a flow diagram illustrating one embodiment of a method 300 for facilitating control of permissions in a virtualization environment. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a host controller (e.g., host controller 107 of FIG. 1).

Referring to FIG. 3, at block 310, method 300 begins with associating virtual machines with labels. In one embodiment, the associations are performed based on user input. Alternatively, processing logic may associate a label with a virtual machine automatically upon detecting a certain event (e.g., when a user of a virtual machine moves to a new department within a company). At block 320, method 300 stores the labels in association with respective virtual machines in a database 106.

At block 330, method 300 associates users and/or groups of users with roles and virtual machine labels. In one embodiment, the associations are performed based on user input. Alternatively, processing logic may associate a user with a role and/or a label automatically upon detecting a certain event (e.g., when a user's title changes, when a user moves to an office in a different location, etc.). At block 340, method 300 stores user identifiers and/or user group identifiers in association with respective roles and labels in a database.

At block 350, method 300 controls user actions pertaining to virtual machines based on corresponding user roles and labels. In particular, for each user request to perform a certain action concerning a virtual machine (e.g., modify a virtual machine or delete a virtual machine), processing logic determines the roles of the user and the labels assigned to the user, and decides whether to allow the requested action based on the corresponding roles and labels. In some embodiments, this determination is performed using roles and labels associated with the user. In other embodiments, this determination is performed using roles and labels associated with the user's group(s). In yet other embodiments, the determination is performed by combining roles and labels associated with the user's group(s) with roles and labels associated with the user individually.

Figure 4:
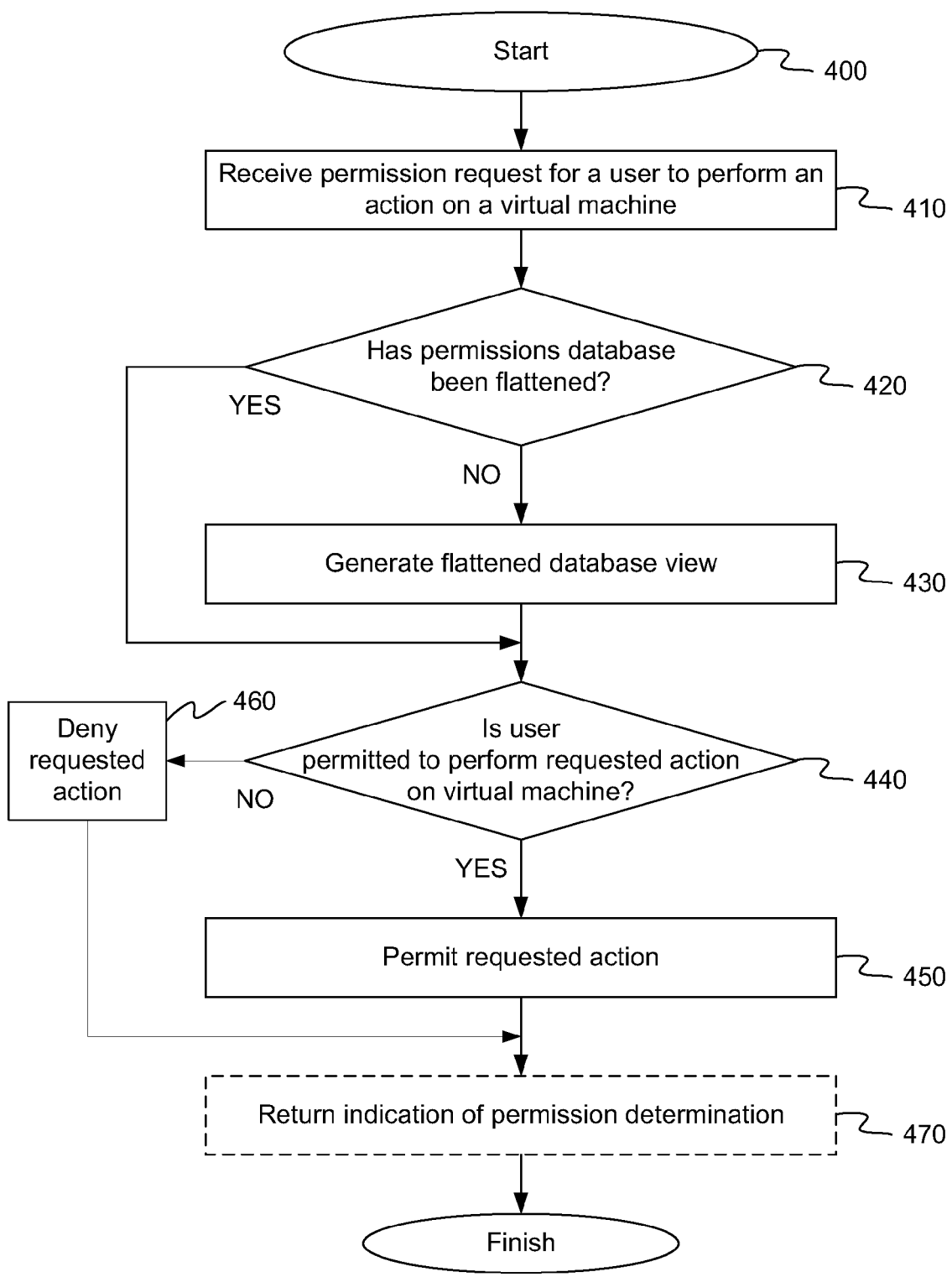
FIG. 4 is a flow diagram illustrating a method for processing permission requests using a flattened permission tree, according to an embodiment.

FIG. 4 is a flow diagram illustrating method for processing permission requests using a flattened permission tree, according to an embodiment of the present invention. The method 400 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 400 may be performed by virtualization manager 202, as shown in FIG. 2.

Referring to FIG. 4, at block 410, method 400 receives a permission request. The permission request may specify one or more of an individual user, a requested action and a virtual machine. For example, the permission request may include a request from a user to perform an action on a particular virtual machine, a request for a list of virtual machines that an individual user can perform a certain action on, or some other request. In one embodiment, virtualization manager 109 running on host controller 107 receives the request from one of client machines 101. In another embodiment, the request may be received from a system administrator, from a user, from an application or program running on one of host server 103 or client machine 101, or from some other source.

At block 420, method 400 determines whether the permissions database 204 has been flattened. In one embodiment, permission manager 216 may determine if a flattened permission view 218 exists in management database 204. If at block 420, method 400 determines that the permissions database 204 has not been flattened, at block 430, method 400 generates a flattened database view 218. In one embodiment, permission manager 216 executes a query, the results of which are stored as flattened permission view 218. Additional details of creating flattened permission view 218 are described below with respect to FIG. 5. If at block 420, method 400 determines that the permissions database 204 has been flattened, method 400 proceeds to block 440.

At block 440, method 400 determines, using the flattened permission view 218, if the user is permitted to perform the requested action on the specified virtual machine. Since flattened permission view 218 defines permissions for each combination of a user and virtual machine, permission manager 216 may need only make a single query to flattened permission view 218 to determine whether the requested action is permitted. For example, permission manager 216 may query flattened permission view 218 for an entry containing the specified user and virtual machine. If an entry exists designating the requested action, at block 450, method 400 may permit the requested action. If no entry exists for that combination, at block 460, method 400 may deny the requested action. In another embodiment, an entry may exist specifically denying permission for the requested action, in which case, method 400 would also deny the requested action at block 460.

At block 470, method 400 may optionally return an indication of the permission determination made at blocks 440-460. For example, permission manager 216 may send a message to the requestor who sent the request received at block 410, indicating the results of the determination (i.e., permission granted/denied, a list of virtual machines on which the user may perform one or more actions, etc.). In another embodiment, rather than returning the indication, method 400 may simply perform or deny the requested action on the specified virtual machine.

Figure 5:
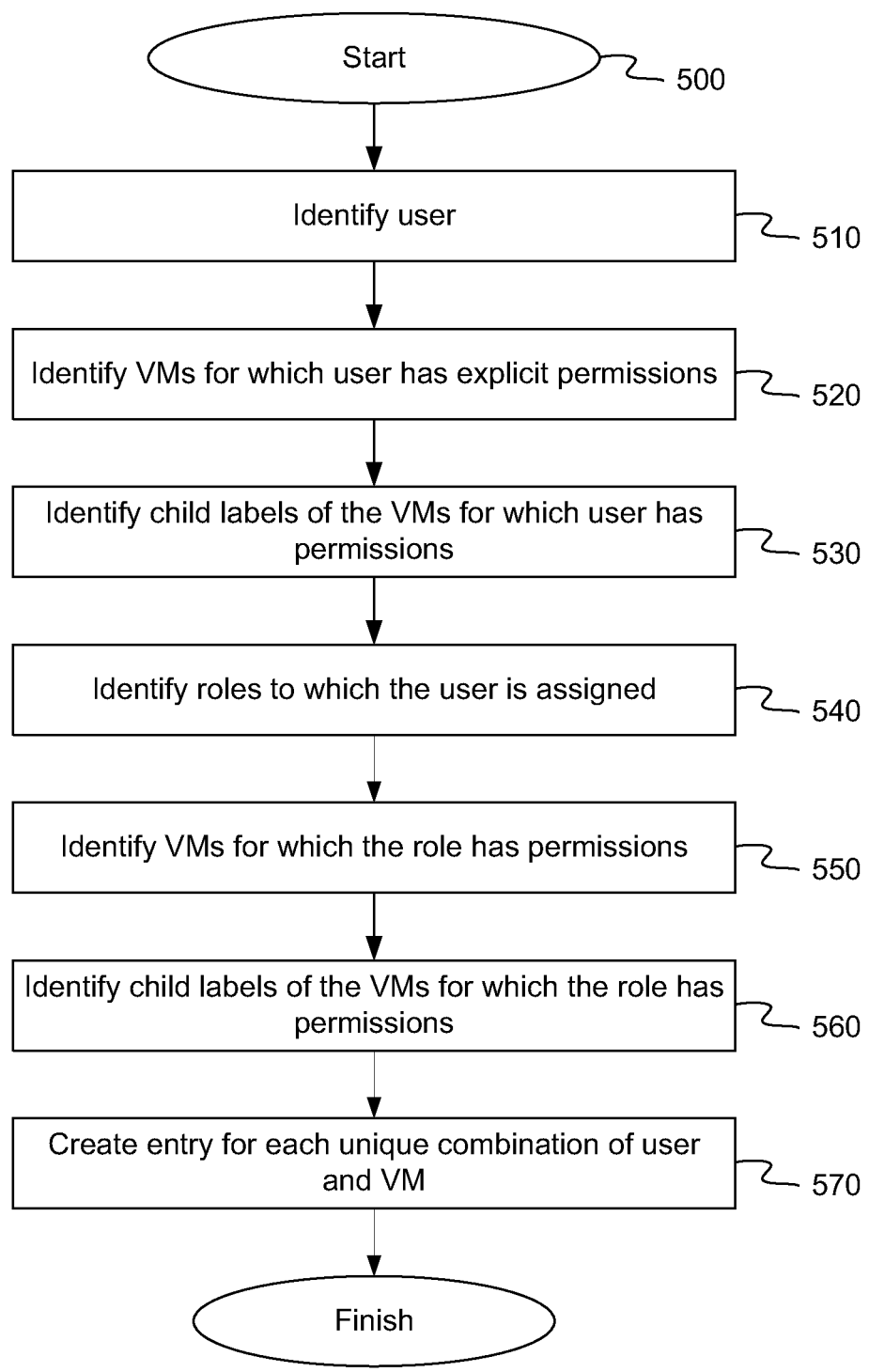
FIG. 5 is a flow diagram illustrating a method for flattening permission trees, according to an embodiment.

FIG. 5 is a flow diagram illustrating method for flattening permission trees, according to an embodiment of the present invention. The method 500 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 400 may be performed by virtualization manager 202, as shown in FIG. 2.

Referring to FIG. 5, at block 510, method 500 identifies a user. The user may be, for example a user specified in a request. However, since the process 500 may be repeated for each user, some other user may be identified at block 510. For example, the user may be identified alphabetically, by seniority, randomly, or in some other manner.

At block 520, method 500 identifies one or more virtual machines for which the identified user has explicit permissions defined. For example, permission manager 216 may consult user permission table 212 to locate entries in user permission table 212 corresponding to the identified user. Each entry may include explicit permissions for the user relating to one or more virtual machines. At block 530, method 500 identifies child labels of the virtual machines for which the user has explicit permissions. As described above, each virtual machine may be assigned a label from a hierarchical label systems. For example, label manager 208 of virtualization manager 202 may consult label table 210 to determine the labels of the virtual machines identified at block 520 and, using the hierarchy, any child labels of the determined labels. In one embodiment, virtual machines assigned these child labels may inherit the permissions of the child labels. Thus, when a user has permissions for a virtual machine having a first label, the user may also have permissions for virtual machines having the child label of the first label.

At block 540, method 500 identifies roles to which the user is assigned. As described above, a user may be assigned to one or more roles within an organization, for purposes of assigning similar permissions to a group of people. At block 550, method 500 identifies one or more virtual machines for which the role to which the user is assigned has permissions. For example, permission manager 216 may consult role table 214 to locate entries in role table 214 corresponding to the identified role. Each entry may include explicit permissions for the role relating to one or more virtual machines.

At block 560, method 500 identifies child labels of the virtual machines for which the role has explicit permissions. For example, label manager 208 of virtualization manager 202 may consult label table 210 to determine the labels of the virtual machines identified at block 550 and, using the hierarchy, any child labels of the determined labels. In one embodiment, virtual machines assigned these child labels may inherit the permissions of the child labels. Thus, when a role has permissions for a virtual machine having a first label, the role may also have permissions for virtual machines having the child label of the first label.

At block 570, method 500 creates an entry in flattened permission view 218 for each unique combination of a user and a virtual machine. For example, permission manager 216 may create a separate entry for the user identified at block 510 and each of the virtual machines identified at blocks 520-560 indicating that the user has permissions on each of the identified virtual machines. Since each combination has a separate entry, a requestor may need only make a single query of flattened permission view 218 to determine whether a user has permissions for a certain virtual machine.

Figure 6:
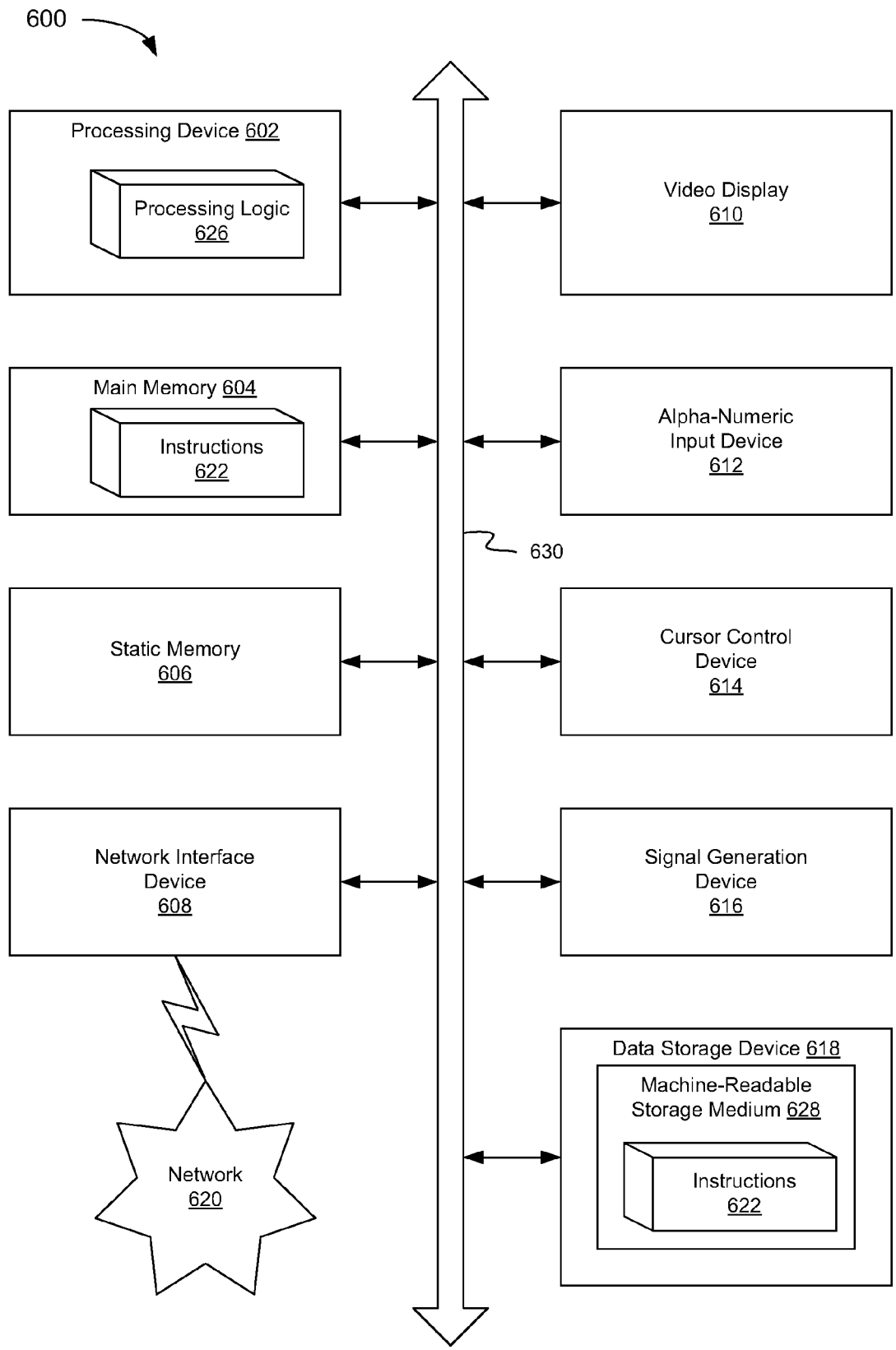
FIG. 6 is a block diagram illustrating a computer system, according to an embodiment.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a computing device, such as client 101, host server 103 or host controller 107 running virtualization manager 109.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-accessible storage media. The instructions 622 may further be transmitted or received over a network 620 via the network interface device 608.

The machine-readable storage medium 628 may also be used to store instructions for flattening permission trees, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
receiving a permission request, the request indicating a user and an entity in a virtual machine system;
flattening, by a processing device, a permissions database associated with the virtual machine system to generate a flattened database view, wherein the permissions database to store descriptive labels of entities in the virtual machine system, and wherein the flattened database view defines permissions for the user to access the entities in the virtual machine system in view of the descriptive labels, wherein flattening the permissions database comprises:
identifying a first set of entities in the virtual machine system for which the user has explicit permissions defined in the permissions database,
identifying a second set of entities in the virtual machine system for which a role to which the user is assigned has explicit permissions defined in the permissions database;
identifying a third set of entities in the virtual machine system that inherit the explicit permissions of entities in the first and second sets of entities, wherein entities in the third set of entities are assigned child labels in a labeling hierarchy of entities in the virtual machine system, and
creating a separate entry in the flattened database view for each unique combination of the user and one of the entities in the first, second and third sets of entities in the virtual machine system, wherein the flattened database view comprises a stored query accessible as a virtual table in the permissions database computed from data stored in the permissions database;
determining, using the flattened database view, whether the user has permission to access the entity in the virtual machine system, wherein determining whether the user has permission to access the entity in the virtual machine system comprises issuing a single query to the flattened database view for an entry comprising the user and the entity; and returning an indication of whether the user has permission to access the entity in the virtual machine system.

2. The method of claim 1, wherein the permission request is received from a client device.

3. The method of claim 1, wherein flattening the permissions database comprises:
- identifying a first entity in the virtual machine system for which the user has explicit permissions defined in the permissions database; and
- identifying a second entity in the virtual machine system that is a child of the first entity using the labeling hierarchy of entities in the virtual machine system.

4. The method of claim 3, wherein flattening the permissions database further comprises:
- identifying the role to which the user is assigned;
- identifying a third entity in the virtual machine system for which the role has permissions defined in the permissions database; and
- identifying a fourth entity in the virtual machine system that is a child of the third entity using the labeling hierarchy of entities in the virtual machine system.

5. The method of claim 4, wherein flattening the permissions database further comprises:
- creating a separate entry in the flattened database view for each unique combination of the user and one of the first, second, third and fourth entities.

6. The method of claim 1, wherein the indication of whether the user has permission to access the entity is affirmative if the entry in the flattened database view comprising the user and the entity is located.

7. The method of claim 1, wherein the indication of whether the user has permission to access the entity is negative if the entry in the flattened database view comprising the user and the entity is not located.

8. The method of claim 1, wherein the entity in the virtual machine system comprises at least one of a virtual machine, a virtual disk, a host server, or a virtual data center.

9. A system comprising:
- a processing device;
- a memory coupled to the processing device; and
- a virtualization manager, executable by the processing device from the memory, to:
  - receive a permission request from a client, the request indicating a user and an entity in a virtual machine system;
  - flatten a permissions database associated with the virtual machine system to generate a flattened database view, wherein the permissions database to store descriptive labels of entities in the virtual machine system, wherein the flattened database view defines permissions for the user to access the entities in the virtual machine system in view of the descriptive labels, wherein to generate the flattened database view, the virtualization manager is executable to:
    - identify a first set of entities in the virtual machine system for which the user has explicit permissions defined in the permissions database,
    - identify a second set of entities in the virtual machine system for which a role to which the user is assigned has explicit permissions defined in the permissions database,
    - identify a third set of entities in the virtual machine system that inherit the explicit permissions of entities in the first and second sets of entities, wherein entities in the third set of entities are assigned child labels in a labeling hierarchy of entities in the virtual machine system, and
    - create a separate entry in the flattened database view for each unique combination of the user and one of the entities in the first, second and third sets of entities in the virtual machine system, wherein the flattened database view comprises a stored query accessible as a virtual table in the permissions database computed from data stored in the permissions database;
  - determine whether the user has permission to access the entity in the virtual machine system using the flattened database view, wherein to determine whether the user has permission to access the entity in the virtual machine system, the virtualization manager is executable to issue a single query to the flattened database view for an entry comprising the user and the entity; and
  - return an indication of whether the user has permission to access the entity in the virtual machine system.

10. The system of claim 9, wherein to flatten the permissions database, the virtualization manager is executable to:
- identify a first entity in the virtual machine system for which the user has explicit permissions defined in the permissions database; and
- identify a second entity in the virtual machine system that is a child of the first entity using the labeling hierarchy of entities in the virtual machine system.

11. The system of claim 10, wherein to flatten the permissions database, the virtualization manager is further executable to:
- identify the role to which the user is assigned;
- identify a third entity in the virtual machine system for which the role has permissions defined in the permissions database; and
- identify a fourth entity in the virtual machine system that is a child of the third entity using the labeling hierarchy of entities in the virtual machine system.

12. The system of claim 11, wherein to flatten the permissions database, the virtualization manager is further executable to:
- create a separate entry in the flattened database view for each unique combination of the user and one of the first, second, third and fourth entities.

13. The system of claim 9, wherein the indication of whether the user has permission to access the entity is affirmative if the entry in the flattened database view comprising the user and the entity is located.

14. The system of claim 9, wherein the indication of whether the user has permission to access the entity is negative if the entry in the flattened database view comprising the user and the entity is not located.

15. The system of claim 5, wherein the entity in the virtual machine system comprises at least one of a virtual machine, a virtual disk, a host server, or a virtual data center.

16. A non-transitory machine-readable storage medium storing instructions which, when executed, cause a processing device to:
- receive a permission request, the request indicating a user and an entity in a virtual machine system;
- flatten a permissions database associated with the virtual machine system to generate a flattened database view, wherein the permissions database to store descriptive labels of entities in the virtual machine system, and wherein the flattened database view defines permissions for the user to access the entities in the virtual machine system in view of the descriptive labels, wherein to flatten the permissions database, the instructions to cause the processing device to:
identify a first set of entities in the virtual machine system for which the user has explicit permissions defined in the permissions database,
identify a second set of entities in the virtual machine system for which a role to which the user is assigned has explicit permissions defined in the permissions database,
identify a third set of entities in the virtual machine system that inherit the explicit permissions of entities in the first and second sets of entities, wherein entities in the third set of entities are assigned child labels in a labeling hierarchy of entities in the virtual machine system, and
create a separate entry in the flattened database view for each unique combination of the user and one of the entities in the first, second and third sets of entities in the virtual machine system, wherein the flattened database view comprises a stored query accessible as a virtual table in the permissions database computed from data stored in the permissions database;
determine, using the flattened database view, whether the user has permission to access the entity in the virtual machine system, wherein to determine whether the user has permission to access the entity in the virtual machine system, the instructions to cause the processing device to issue a single query to the flattened database view for an entry comprising the user and the entity; and
return an indication of whether the user has permission to access the entity in the virtual machine system.

17. The non-transitory machine-readable storage medium of claim 16, wherein to flatten the permissions database, the instructions to cause the processing device to:
identify a first entity in the virtual machine system for which the user has explicit permissions defined in the permissions database; and
identify a second entity in the virtual machine system that is a child of the first entity using the labeling hierarchy of entities in the virtual machine system.

18. The non-transitory machine-readable storage medium of claim 17, wherein to flatten the permissions database, the instructions to cause the processing device further to:
identify the role to which the user is assigned;
identify a third entity in the virtual machine system for which the role has permissions defined in the permissions database; and
identify a fourth entity in the virtual machine system that is a child of the third entity using the labeling hierarchy of entities in the virtual machine system.

19. The non-transitory machine-readable storage medium of claim 18, wherein to flatten the permissions database, the instructions to cause the processing device further to:
create a separate entry in the flattened database view for each unique combination of the user and one of the first, second, third and fourth entities.

20. The non-transitory machine-readable storage medium of claim 16, wherein the indication of whether the user has permission to access the entity is affirmative if the entry in the flattened database view comprising the user and the entity is located.

21. The non-transitory machine-readable storage medium of claim 16, wherein the indication of whether the user has permission to access the entity is negative if the entry in the flattened database view comprising the user and the entity is not located.

22. The non-transitory machine-readable storage medium of claim 16, wherein the entity in the virtual machine system comprises at least one of a virtual machine, a virtual disk, a host server, or a virtual data center.

* * * * *